(12) United States Patent
Torres

(10) Patent No.: US 9,789,630 B2
(45) Date of Patent: Oct. 17, 2017

(54) METHOD AND DEVICE FOR TREATING DIATOMACEOUS EARTH WASTE AND OTHER WASTE IN ORDER TO OBTAIN CONSTRUCTION MATERIALS

(75) Inventor: Jaime Vite Torres, Estado de Mexico (MX)

(73) Assignee: Instituto Nacional De Investigacions Nucleares, Estado de Mexico (MX)

( * ) Notice: Subject to any disclaimer, the term of this patent is extended or adjusted under 35 U.S.C. 154(b) by 982 days.

(21) Appl. No.: 13/878,938

(22) PCT Filed: Oct. 14, 2011

(86) PCT No.: PCT/MX2011/000126
§ 371 (c)(1),
(2), (4) Date: Sep. 13, 2013

(87) PCT Pub. No.: WO2012/050415
PCT Pub. Date: Apr. 19, 2012

(65) Prior Publication Data
US 2013/0341815 A1 Dec. 26, 2013

(30) Foreign Application Priority Data
Oct. 14, 2010 (MX) ................. MX/a/2010/011281

(51) Int. Cl.
*B29B 9/02* (2006.01)
*C04B 14/08* (2006.01)
(Continued)

(52) U.S. Cl.
CPC ............... *B29B 9/02* (2013.01); *B01J 20/14* (2013.01); *C04B 14/08* (2013.01); *C04B 18/04* (2013.01);
(Continued)

(58) Field of Classification Search
CPC . B29B 9/02; B01J 20/14; C04B 20/04; C04B 28/001; C04B 14/08; C04B 18/04; Y02W 30/91
(Continued)

(56) References Cited

U.S. PATENT DOCUMENTS 2,716,070 A * 8/1955 Seipt .................. B28B 1/52
106/672
4,377,416 A * 3/1983 Maul ................. C04B 28/04
106/718
(Continued)

*Primary Examiner* — Nahida Sultana
(74) *Attorney, Agent, or Firm* — McDonnell Boehnen Hulbert & Berghoff LLP

(57) ABSTRACT

The invention relates to a method and furnace allowing the use of filter earth (diatomaceous earth) waste, in which the organic material is removed using the method of the application. The furnace comprises a container in which the industrial waste is deposited, and a folding table is used to transport the material. The invention also includes an agitator with a base, used to lower blades and remove the treated material. The gases generated are collected by an extractor which includes a cooling jacket and are subsequently sent to an absorber system in which they are neutralized. Said device and method are used to obtain lightweight materials with low porosity and high compression strength, rendering solid granular industrial waste that is dangerous to the environment suitable for use in the construction or mechanical industries.

2 Claims, 1 Drawing Sheet

(51) Int. Cl.
  *C04B 18/04* (2006.01)
  *C04B 28/00* (2006.01)
  *C04B 20/04* (2006.01)
  *B01J 20/14* (2006.01)

(52) U.S. Cl.
  CPC ............ *C04B 20/04* (2013.01); *C04B 28/001* (2013.01); *Y02W 30/91* (2015.05); *Y02W 30/93* (2015.05)

(58) Field of Classification Search
  USPC .................................. 264/40.1, 241; 425/112
  See application file for complete search history.

(56) References Cited

U.S. PATENT DOCUMENTS

| | | | | |
|---|---|---|---|---|
| 4,935,034 A * | 6/1990 | Alexander | ............ | C04B 28/04 106/718 |
| 5,179,062 A * | 1/1993 | Dufour | ............ | B01J 20/14 423/326 |
| 5,496,392 A * | 3/1996 | Sims | ............ | C03B 3/02 423/DIG. 18 |
| 5,589,118 A * | 12/1996 | Ford, Jr. | ............ | B29B 9/08 264/122 |
| 5,769,938 A * | 6/1998 | Ueshima | ............ | A62D 3/33 106/697 |
| 8,845,940 B2 * | 9/2014 | Niven | ............ | C04B 28/02 106/638 |
| 9,034,101 B2 * | 5/2015 | Ronin | ............ | C04B 28/04 106/757 |
| 2004/0262801 A1* | 12/2004 | Hojaji | ............ | C03C 11/002 264/44 |
| 2007/0135667 A1* | 6/2007 | Araki | ............ | B29B 17/02 585/241 |
| 2008/0199707 A1* | 8/2008 | Kawai | ............ | B28B 13/022 428/428 |
| 2009/0229598 A1* | 9/2009 | Cao | ............ | B09B 3/0041 126/617 |
| 2011/0174732 A1* | 7/2011 | Lu | ............ | B01J 20/14 210/639 |
| 2013/0216704 A1* | 8/2013 | Brien | ............ | E01C 21/00 427/136 |

* cited by examiner

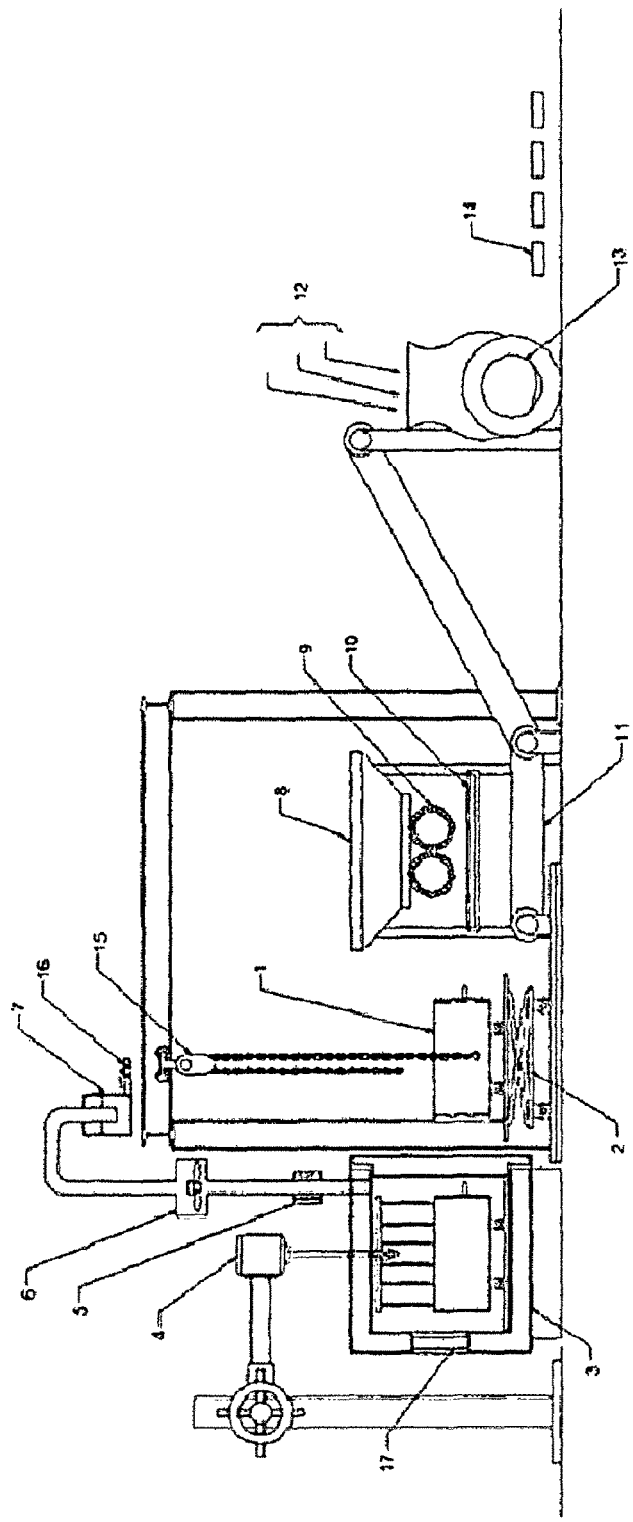

METHOD AND DEVICE FOR TREATING DIATOMACEOUS EARTH WASTE AND OTHER WASTE IN ORDER TO OBTAIN CONSTRUCTION MATERIALS

This application is a U.S. national phase application of International Application No. PCT/MX2011/000126 filed Oct. 14, 2011, which claims priority to Mexican Patent Application No. MX/a/2010/011281 filed Oct. 14, 2010, the contents of which are hereby incorporated by reference in their entirety.

BACKGROUND OF THE INVENTION

Diatomite (diatomaceous earth) is a marine sedimentary rock. This substance can be found in lake deposits consists mainly of accumulated shells or hydrous silica secreted by diatoms which are microscopic organisms, chemically consists of silicon dioxide ($SiO_2$) which is essentially inert; is ionically attacked by strong alkali and hydrofluoric acids. Other components of diatomite are: sand, clay, volcanic ash, magnesium carbonate, soluble salts and organic matter.

The types and amounts of impurities are highly variable and depend on the sedimentation conditions and the time of diatomite disposition. Diatomites are used primarily:
1) as filters
2) as insulating material
3) as filler material In the first case the substances are used for waste sludge filters, due to its high porosity and heat resistance (melting point close to 1593° C.), this material is used as thermal insulator and for this its structure may be in the form of aggregate powder or bricks. Its use as a filler material is due to the fact that after this material is used, its reuse is not recommended, because it is contaminated by absorbed substances or products, hence its application for filling.

The uses of diatomaceous earth are very widely applicable, as the case of sugar refining, as well as in the production of solvents, antibiotics, fats and oils; these materials are also very importantly used in paint and paper industries.

This research bears some similarity to Patent CN 19969696118706, Dec. 31, 1997/Jun. 14, 1996 to Hong bin Liu, but in this case a rough concrete was developed for specific purposes, in our work, we are proposing a furnace to produce materials, such as bricks, lattices and ceramic materials for construction; also, in patent JP08319143A2, 3 Dec. 1996, Denki Kagaru proposed a method for obtaining a product which is mixed with cement, in our case, we propose a furnace, wherein the flue gases are absorbed and the obtained material has the adequate grain size to be mixed with binding agents for use in the building industry, diatomaceous earth has also been recycled to produce ceramic material according to patent JP00086397A2, Mar. 28, 2000. The difference with our work is that we start from waste to obtain a useful and highly competitive material.

There is other work on the incineration of waste JP54128477, Oct. 5, 1979 to which calcium sulfate is added and is solidified with an accelerator, our work involves obtaining material, grinding and screening the same prior to treatment with binding agents, so it also differs from this latest research.

Object of the Invention

The present invention has as an object using granular solid industrial waste materials that are harmful to the environment and which are from diatomaceous earth, which, when mixed with binding agents, water or other granular solid waste as: tailings, foundry sand and volcanic ash in said mixture, new building or ceramic materials can be produces which are compression-resistant, have low porosity, resistant to abrasion and fatigue tests and weighing 25% less than conventional materials like bricks, lattices, tiles, pipes, drywall. The new materials are useful in the construction industry, and also the obtained ceramic materials can be applied in the field of mechanical engineering.

DETAILED DESCRIPTION OF THE INVENTION

This process is characterized by having a furnace which removes organic material that adheres to the diatomaceous earth to achieve homogenization in the incineration process, and has pedestal agitator, which is a device whose function is to lower a set of blades and removing the material treated into the furnace. It also has a viewing window to see the process that takes place in the furnace, the gases generated during the process are removed by an exhaust, and conducted to the absorber where they are neutralized. The details of the process used in the furnace to treat filter earth waste as a construction material are shown in the following description and the accompanying FIGURES.

FIG. 1 presents an overview of the manner in which the process of treatment of diatomaceous earth is carried out until the obtainment of the material to be used in the construction industry. With reference to said FIGURE and the description of the devices, the diatomaceous earth contaminated dynamic material absorbed during the process, is deposited in the container (1) which is the container for storing the industrial waste, and which is located on a folding table (2) and a hoist (15) which serves to introduce and remove material from the furnace; the sample is subsequently placed in the furnace (3) which is the system to perform the heat treatment to the residue; when is already placed in this point the sample has a pedestal agitator (4) which is a device used to lower the blades and remove material treated in the furnace for approximately 60 minutes and keeping the temperature of 850° C. During this time the sample is stirred every 10 minutes. To watch the ignition process it has a window (17). The gases generated from the combustion or burning of waste are cooled by a system (5) consisting of a jacket with water inlet and outlet, the gases are conducted through a pump (6) directly to the absorber (7) by this device it is prevented that the gases are emitted into the atmosphere. This system is coupled to a valve (16) for extracting samples. Once treated, the industrial waste the container (1) is extracted and empties its contents into the hopper (8); from this vessel, the sample is passed to the mill (9) where the sample obtains a grain size ranging between 100 and 200 µm, subsequently passed to a sieve (10) where the sample is sieved, about 500 g of this mixture is collected and mixed using the cracking method and then a sample of 50 g is taken from this same material to carry out the qualitative and quantitative chemical analysis, using analytical techniques such as Plasma Emission Spectrometry or Atomic Absorption, in order to determine the presence and concentration of heavy metals in the chemical matrix of the granular solid industrial waste. In case of observing in the chemical analyses metal concentrations less than or equal to the limits allowed by law, in this situation the sample is deposited directly on the conveyor belt (11).

In case of observing the presence and concentration of metals at levels higher than allowed by the regulations in metals such as chromium, lead, or vanadium, we proceed to perform the extraction or leaching using reducing agents, complexing agents and surfactants, the time used for the operation is 120 minutes, the temperature of 60° C. and the pH ranges were 2, 5, 7, and 10. This step is performed in order to test the pH, allowing to optimally solubilize metals within the leaching solution. The process and apparatus used for leaching are done following the methodology described in U.S. Pat. No. 5,356,601 from 1994, U.S. Pat. No. 5,376,000 from 1994; Mexican Patent No. 1,867,902 from 1997. Concluding the leaching process, the sample is filtered, dried in a furnace at 80° C.; after that the sample is deposited in a conveyor belt (11) whose function is to guide the sample to a mixer (13) where other granular solids residues (such as tailings or foundry sand or volcanic ash) are added previously treated in thermostated columns, wherein the samples are leached using reducing agents, complexing agents and surfactants. The time used for the operation is 120 minutes, a temperature of 60° C. and the pH ranges are 2, 5, 7 and 10, following the leaching methodology described U.S. Pat. No. 5,356,601 from 1994, U.S. Pat. No. 5,376,000 from 1994; Mexican Patent No. 1,867,902 from 1997. After leaching, the samples are filtered, dried in a furnace at 80° C. and 33% by volume of granular solid waste, 33% by volume of diatomaceous earth, 34% by volume of binding agents are added, sufficient supplementary water is added until obtaining a mixture (13). After combining the ingredients for 15 minutes, the mixture is poured into molds (14).

Methodology for Performing the Post and Molding

Both bricks and blocks for walls and ceilings can be manufactured with mortars based on regular and lightweight aggregates. Among the main objectives to be achieved with these building elements are: to lighten buildings, increased insulation and ease of operation. Light inert materials are generally chosen, diatomaceous earth very well satisfy the above objectives because we obtained materials whose compressive strength was 235 kg/cm$^2$ and their water absorption percentage was of 21%. Both tests were conducted under international standards. On other hand, the manufacture may be accomplished by conveniently dosed mortars and concretes, with fluid, pasty or dry consistency depending on the ensuing system and the piece to be molded.

In case that the qualitative and quantitative chemical analysis indicate the presence of heavy metals in the samples of granular, solid industrial residues, such as Pb, Cr, Ni, Cu, etc. at concentrations greater than those permitted by law in diatomaceous earth chemical matrices, the leaching process needs to be done using the thermostated columns, similarly as was done with mining granular, solid industrial waste (tailings) or with granular solid waste from the automotive industry (foundry sand).

a) Preparation of the Post.

In our research, for making bricks, tubes, tiles, drywall, lattices, a paste composed of diatomaceous earth base obtained from industrial waste is used (which was submitted to the standard CRETIB, resulting negative, thus ensuring that the product obtained it is not harmful or toxic to be used) as well as tailings, foundry sand, volcanic ash and binding agents. The mixture of the above components is kneaded with a suitable amount of water without exceeding its plasticity. For making bricks an average of 33% by volume of diatomaceous earth, 13% by volume of tailings, 10% by volume of volcanic ash, 10% by volume of foundry sand and 34% by volume of binder agent were used, yielding bricks with an average weight less than 1 kg with the following dimensions: length 25 cm, width 12 cm, and 8 cm thick.

b) Mold

If the molding is done by direct compression or by vibrating, the mortar or concrete must be dry. If the process is made by casting, they must be fluid. The processes may be manual or mechanical depending on the production, cost and product quality. In our case we used the manual procedure because the individually manufactured pieces were for laboratory analysis and not for commercial use. We used metal and wooden molds; the procedure was as follows.

EXAMPLES

1) Brick Manufacturing

Bricks measuring 25 cm long, 12 cm wide and 8 cm thick were manufactured with an average weight of 974 g. Use was made of 33% by volume of diatomaceous earth, 13% by weight of tailings, 10% by volume of volcanic ash, 10% by volume of foundry sand and 34% by volume of binder agent (cement is used as binder). As a result of mechanical tests applied to cubes of 2 inches per side, according to the ASTM standard 170-50, an average compressive strength of 272.3 kg/cm$^2$ was obtained, also the water percent absorption was 17% which meant that the obtained material absorbs less water than specified in ASTM standard 121-48, which has 21% maximum water absorption percentage.

2) Lattice Manufacturing

Lattices were produced whose geometric shape was square with curved vertices and a centered circle with 8 cm diameter, the height was of 40 cm and each side is 25 cm and the thickness is 12 cm. For manufacturing the lattices, we used on average 33% by volume of diatomaceous earth, 13% by weight of tailings, 10% by volume of foundry sand, 10% of volcanic ash and 34% by volume of binding agent (cement was used as binders) with each piece having an average weight of 3000 g. The physical and mechanical properties of the lattices were similar to those of the obtained bricks.

3) Ceramics Manufacturing

Ceramic materials (bricks, lattices and various specimens) were manufactured whose dimensions were similar to those outlined in Examples 1 and 2, combined with 20-33% by volume of granular solid waste from diatomaceous earths and other 20-33% of granular solid residues (tailings, foundry sand, volcanic ash), these residues had the particularity that the heavy metals present in their chemical matrix were leached prior to their application for manufacturing ceramic materials. To perform the leaching thermostated coupled columns were used, as binding agents 10-20% by volume clay or kaolin were used, as well as 10-14% by volume of feldspar and sufficient water was used to make a paste which was poured into molds, preheating to 100° C. When the water contained in the samples was evaporated, these were transferred to another furnace at a temperature between 1000-1200° C. The obtained materials had an average compression strength of 264 kg/cm$^2$, which means these products have a compressive strength about 3 times higher than conventional materials. Also, they practically have any porosity and their weight was between 25-30% lower than brick or lattices made with conventional materials.

Having sufficiently disclosed my invention, I consider a novelty and therefore claim as property what is contained in the following claims:

1. A process for producing building materials from granular solid industrial waste from diatomaceous earth, comprising:

a) thermally treating granular solid industrial waste from diatomaceous earth in a first furnace at a temperature of 850° C. for 60 min, wherein the granular solid industrial waste is agitated every 10 minutes;
b) extracting the thermally treated granular solid industrial waste from the furnace;
c) emptying the granular solid industrial waste into a hopper and then leading it to a mill, wherein the mill granulates the granular solid industrial waste forming a granular solid industrial waste having a granular size of 100-200 μm;
d) leading the granular solid industrial waste to a sieve, wherein it is sieved;
e) collecting a representative sample of the granular solid industrial waste and carrying out qualitative and quantitative analyses of the sample by different analytical techniques for detecting the metal contents;
f) leaching the granular solid industrial waste using one or more of reducing agents, complexing agents and surfactants in a thermostated column until its metal content is within an allowed range;
g) filtering the granular solid industrial waste and drying the granular solid industrial waste in a second furnace at 80° C. for 60 minutes;
h) depositing the granular solid industrial waste on a conveyor belt for transfer to a mixer;
i) combining in the mixer 33% by volume of the granular solid industrial waste and 33% by volume of other granular solid residues selected from the group consisting of tailings, foundry sand, and volcanic ash;
j) adding 33% of a binder agent to the mixer and mixing with water for 15 minutes until a pasty consistency is obtained; and
k) emptying the mixture into molds.

2. A process for producing ceramic materials from granular solid industrial waste from diatomaceous earth, comprising:
a) thermally treating granular solid industrial waste from diatomaceous earth in a first furnace at a temperature of 850° C. for 60 min, wherein the granular solid industrial waste is agitated every 10 minutes;
b) extracting the thermally treated granular solid industrial waste from the furnace;
c) emptying the granular solid industrial waste into a hopper and then leading it to a mill, wherein the mill granulates the granular solid industrial waste forming a granular solid industrial waste having a granular size of 100-200 μm;
d) leading the granular solid industrial waste to a sieve, wherein it is sieved;
e) collecting a representative sample of the granular solid industrial waste and carrying out qualitative and quantitative analyses of the granular solid industrial waste by different analytical techniques for detecting the metal contents;
f) leaching the granular solid industrial waste using one or more of reducing agents, complexing agents and surfactants in a thermostated column until its metal content is within an allowed range;
g) filtering the granular solid industrial waste and drying the granular solid industrial waste in a second furnace at 80° C. for 60 minutes;
h) depositing the granular solid industrial waste on a conveyor belt for transfer to a mixer;
i) combining in the mixer between 23-33% by volume of the leached granular solid industrial waste from diatomaceous earth, 10-13% by volume of tailings, 10-13% by volume of foundry sands, 10-13% by volume of volcanic ash, between 10-20% by volume of binding agents, and between 5-14% of feldspar;
j) adding water to the mixer and mixing with the components to form a paste;
k) pouring the paste into molds and preheating in a furnace at 80° C. in order to evaporate the excess water contained in the paste; and
l) transferring the materials to a third furnace operating at a temperature of 1000° C.-1200° C. for 120 minutes thereby producing ceramic materials;
wherein the binding agent is clay or kaolin.

* * * * *